United States Patent [19]

Bergna et al.

[11] Patent Number: 4,477,492

[45] Date of Patent: Oct. 16, 1984

[54] PROCESS FOR PREPARING SUPERFICIALLY POROUS SUPPORTS FOR CHROMATOGRAPHY AND CATALYSTS

[75] Inventors: Horacio E. Bergna; Joseph J. Kirkland, both of Wilmington, Del.

[73] Assignee: E. I. Du Pont de Nemours and Company, Wilmington, Del.

[21] Appl. No.: 487,894

[22] Filed: Apr. 22, 1983

[51] Int. Cl.³ .................... B05D 7/00; C02F 1/68
[52] U.S. Cl. .................... 427/215; 427/219; 428/403; 428/406; 210/198.2; 210/656; 55/67; 55/386
[58] Field of Search ............... 427/215, 219; 210/656, 210/198.2; 502/407, 527; 55/67, 386; 428/404, 406, 403

[56] References Cited

U.S. PATENT DOCUMENTS 3,485,658 12/1969 Iler ........................... 117/69
3,505,785 4/1970 Kirkland ..................... 55/67
4,131,542 12/1978 Bergna et al. ................ 210/31

FOREIGN PATENT DOCUMENTS 1016635 1/1966 United Kingdom .

OTHER PUBLICATIONS

"Gas Chromatography 1964", The Institute of Petroleum, London, W1, pp. 285-300, (1965)—Kirkland(I).
Anal. Chem. 37, 1458-1461, (1965)—Kirkland(II).

Primary Examiner—Norman Morgenstern
Assistant Examiner—K. E. Jaconetty

[57] ABSTRACT

There is disclosed a process for preparing superficially porous macroparticles comprising spray drying a specified well-mixed slurry of core macroparticles, colloidal inorganic microparticles and a liquid and sintering the resulting product to cause a 5%-30% decrease in surface area.

13 Claims, 1 Drawing Figure

U.S. Patent     Oct. 16, 1984     4,477,492
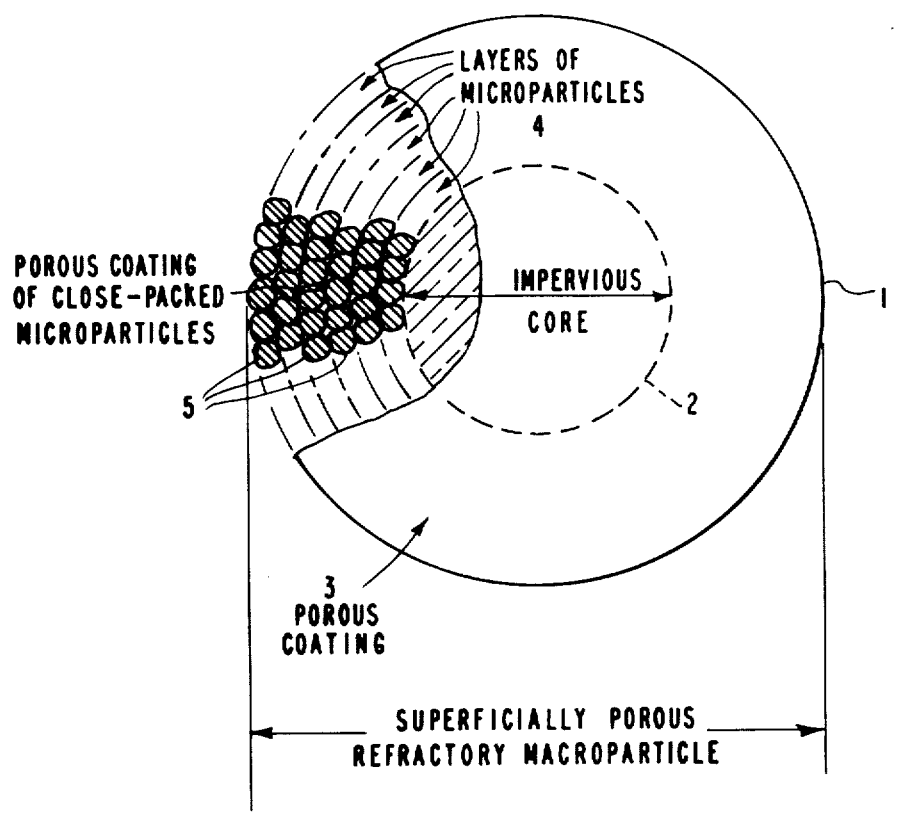

PROCESS FOR PREPARING SUPERFICIALLY POROUS SUPPORTS FOR CHROMATOGRAPHY AND CATALYSTS

BACKGROUND OF THE INVENTION

This invention relates to a process for preparing superficially porous macroparticles for use in chromatography and as catalysts or catalyst supports.

In chromatography it is customary to pass a mixture of the components to be resolved in a carrier fluid through a separative zone in a chromatographic apparatus. The separating or resolving zone generally consists of a material which is chromatographically sorptively active. Chromatographic apparatus generally employs packed columns of granular material. For analytical application the columns usually are of small internal diameter, while for preparative chromatography, larger diameter columns are employed. Support materials commonly employed for chromatography are granules having sorptively active surfaces or surfaces which have been coated with a substance which is sorptively active. Passing the mixture to be separated through the column results in repeated chemical interactions between the different components of the sample and the chromatographically active surfaces. Different compounds migrate at different speeds through the column because of these repeated, selective interactions. The separated components in the column effluent are generally passed through an analyzer or detector, for example a flame ionization detector in gas chromatography or an ultraviolet absorption detector in liquid chromatography, to determine when the resolved components emerge from the column and to permit the identification and quantitative measurement of each component.

Particles for use as catalysts or for catalyst supports should have overall size and porosity to permit ready access of reacting species to catalytically active sites within the particles.

It has long been recognized that superior chromatographic supports for liquid chromatography would consist of a plurality of discrete particles of regular shape, preferably spheres, having surfaces with a large population of superficial, shallow pores and no deep pores. The support granules should be regular and their surface characteristics readily controllable and reproducible. The same ready-access characteristics that make particles superior for chromatography also are desirable for catalysts and catalyst supports. Such particles have been very difficult to realize in practice with a result that the cost of superficially porous column chromatographic packings and particularly catalyst and catalyst supports has inhibited their use.

British Pat. No. 1,016,635 discloses a chromatographic support made by coating a particulate refractory solid on an impermeable core. The coating is accomplished by dispersing the coating material in a suitable liquid in a slurry. The cores are then coated with the slurry, withdrawn, and dried to remove the liquid. The result is a rather loosely held, mechanical coating of nonuniform, disoriented particles. These coated cores may be used as chromatographic supports.

Kirkland (Kirkland, J. J., "Gas Chromatography 1964," A. Goldup, editor, The Institute of Petroleum, London, W.1, pp. 285-300, 1965) has described the preparation of a chromatographic support by bonding successive layers of silica microparticles to glass beads by means of very thin fibrillar boehmite films. These coated cores may be employed as chromatographic or catalysts or catalyst supports.

Coated glass beads consisting of a single layer of finely divided diatomaceous earth particles bonded to the glass beads with fibrillar boehmite have also been described as a chromatographic support (Kirkland reference as above; Kirkland, J. J., Anal. Chem., 37, 1458-1461, 1965).

A method of preparing superficially porous particles by depositing colloidal inorganic particles of a given size and ionic charge from aqueous dispersion onto the surface of a solid, a single monolayer of microparticles at a time, and by repeating the process, to coat the surface with any desired number of monolayers, is described in Canadian Pat. No. 729,581.

U.S. Pat. No. 3,505,785 issued to Kirkland on Apr. 14, 1970, discloses a method of preparing superficially porous particles by first forming a coating consisting of alternate layers of colloidal inorganic microparticles and of an organic colloid, and then removing the alternate monolayers of organic matter so as to obtain a residual coating of layers of colloidal inorganic particles in which all the microparticles are alike.

U.S. Pat. No. 4,131,542, issued to Bergna et al. on Dec. 26, 1978, discloses a process for preparing low-cost silica packing for chromatography comprising (a) spray drying with flowing air at a temperature from 130° C. to 400° C. a silica sol containing from 5-60 weight percent essentially nonaggregated spherical silica particles of uniform size wherein at least 75% of the particles have a diameter of from 0.5 to 2 times the weight average diameter and (b) sintering the resulting porous micrograins to reduce the surface area thereof from 5% to 20%.

Disadvantages of prior art products include coatings which are subject to easy removal as by chipping and flaking, lack of control of variables such as thickness and uniformity of the coating, chemically inhomogeneous surfaces, surface components which are deleterious as catalysts or to certain types of selective adsorption, inability to prepare structures with a uniform surface and with a certain predetermined porosity, and the requirement of many depositions of a single layer at a time. A method which eliminates or minimizes some of these disadvantages is desirable. Moreover it would be advantageous to have the coated materials irreversibly bonded to the core.

SUMMARY OF THE INVENTION

There is disclosed an improved process for preparing superficially porous macroparticles comprising (a) forming a well-mixed slurry of core macroparticles, colloidal inorganic microparticles to coat the macroparticles, and a liquid, said core macroparticles being (1) impervious and stable, (2) regularly shaped and (3) about 5-200 μm in size and said microparticles being substantially uniform in size and shape and having a size of about 4-1000 nm; the ratio of the weight of the microparticles to weight of liquid being from about 0.05 to about 0.5 and the ratio of volume of coating microparticles to total volume of coating microparticles and core macroparticles being from about 0.003 to about 0.7;

(b) atomizing the slurry to form a fine spray using spraying conditions suitable to produce droplets of a size greater than the size of the core macroparticles;

(c) contacting the spray with a drying medium at a temperature of from about 130° to about 400° C. to evaporate the liquid or cooling the spray below the freezing point of the liquid and drying the resulting frozen particles without thawing them; and (d) heating the resulting dried, coated macroparticles at a temperature and for a time sufficient to cause sintering resulting in about 5% to about 30% decrease in surface area of said dried, coated macroparticles.

BRIEF DESCRIPTION OF THE DRAWING

The drawing is a cross-sectional representation of a superficially porous particle made by the process of this invention.

DETAILED DESCRIPTION OF THE INVENTION

The present invention relates to a process for preparing a powder of discrete, superficially porous macroparticles such as that shown diagrammatically in the drawing. The superficially porous macroparticle 1 comprises a core 2 which functions as a substrate for the remaining portion of the macroparticle. Adherred to the surface of the core is a porous coating 3, or crust composed of layers 4 of microparticles 5 which are characteristically in an almost regular close-packed configuration.

Any impervious material suitable for use in chromatography or as a catalyst or catalyst support may be used as the core or macroparticle support. By impervious material is meant a material having a surface sufficiently free from pores so that when employed as the substrate in a chromatographic process or as a catalyst or catalyst support, the substance passing through a zone of these particles will not enter the interior of the core. For most purposes the core should be impervious to nitrogen gas. The shape of the macroparticle cores used by the process of the present invention is generally regular, which is preferred in most chromatographic and catalyst applications. Any macroparticle shape suitable for use in chromatography or as catalysts can be employed, such as saddles, polyhedra, rings, rods, and cylinders. However, spheres are preferred because of their regular and reproducible packing characteristics, ease and convenience of handling, and their general resistance to mechanical degradation.

The composition of the core macroparticle is not critical except that it should be stable to the conditions necessary to prepare the coating and suitable for use in chromatography or as a catalyst. The cores can be, for example, glasses, sand, ceramics, metals or oxides. In addition to truly impervious cores such as these, other types such as alumina silicate molecular-sieve crystals or small-pore porous oxide microspheres such as those described in U.S. Pat. No. 3,855,172, issued to Iler et al. on Dec. 13, 1974, can be used. In general, materials which have some structural rigidity are preferred. Glass beads are preferred macroparticles because of their uniformity of surface characteristics, predictability of packing characteristics, strength and low cost.

The size of the cores is in general not critical. The upper size limit of the macroparticle is determined by the spray-drying equipment and its ability to spray the slurry of colloidal material. In general, the maximum size of the macroparticle will be about 500 $\mu$m. The important factors are that (a) the macroparticles must be maintained in a slurried state and (b) they must be able to pass through the atomizer to be formed as droplets. For spheres or similarly shaped bodies, a diameter or size of 5-200 $\mu$m prior to coating is preferred.

The coating of the finished product to be used as a chromatographic packing material and as a catalyst or catalyst support consists of a thin outer shell of like inorganic refractory microparticles. As used herein, the expression "like microparticles" means microparticles which have about the same size and preferably, but not necessarily, the same chemical composition. For example, the microparticle may be a mixture of colloidal particles of silica and colloidal particles of silica previously coated with a thin layer of alumina. There is no general limitation as to the nature of the composition of these microparticles, except for their suitability for use in chromatography or in catalysis. Choice of composition is based on the eventual application and, for example, the nature of the chromatographically or catalytically active substance, if any, which may be used with the particles or coated on their surfaces, and the substances which will be chromatographically separated or catalytically involved with respect to chemical type, size of molecules, etc.

The microparticle coating should have uniformity so that variation of the thickness of the coating is minimal. When the microparticles are uniform in size, i.e., are substantially all within 50% of the average diameter, the variation in thickness of the coating generally should be no more than one-half the average diameter of the macroparticle.

The particle sizes of the microparticles used in the present process depend on the nature of the particles and their eventual chromatographic or catalytic application. Generally, particle sizes in the range of from 4-1000 nm can be employed. In most cases microparticles in the range of 5-250 nm are preferred.

The size and size range of the microparticles determine the size of the pores of the macroparticle. For some purposes a relatively large pore size in the coating is desired to permit rapid diffusion of components in chromatography and in catalyst processes. During spray drying, microparticles are forced into a very dense structure, because upon spray drying, for example from water, the microparticles become very closely packed due to surface tension effects of water on the microparticle surface as the aquasol is dried. For spherical microparticles, this will approximate a regular close-packed structure (as in FIG. 1), which in practice means that the void space in the coating is less than 45% by volume and as little as 22% by volume.

The closed-packed nature of the microparticle produces a strong hard structure, especially after proper sintering to decrease slightly the macroparticle surface area. The resulting improved particle strength is important both for certain chromatographic applications, and especially in catalysts for large industrial use. Because of their chemical purity and high mechanical strength, the coatings of the present invention are resistant to high temperatures, making them suitable for many hostile environments. Furthermore, the close-packed structure of the microparticles in the porous coating result in very uniform pore structures and narrow pore size distributions which are desirable in both chromatographic and catalytic applications.

The particle size range of the microparticles is important only for controlling the homogeneity of the porous crust in terms of thickness and porosity. For most purposes the particle size range is less than a factor of ten. However, particle size ranges of larger than 10-fold are permitted for certain applications.

The microparticles that make up the coating can be of any desired substance compositionwise which can be reduced to a colloidal state of subdivision; however, they must be dispersible in a medium as a colloidal dispersion. Water is the best medium for dispersions of particles of varying ionic charges. Examples of suitable aqueous sols are amorphous silica, iron oxide, alumina, thoria, titania, zirconia, zircon, and alumina silicates, including colloidal clays such as montmorillonite, colloidal kaolin, attapulgite, and hectorite. Silica is preferred material because of its low order of chemical activity, its ready dispersibility, and the easy availability of aqueous sols of various concentrations.

The exterior and interior surface of the superficially porous refractory macroparticles to be used in chromatographic columns may be further modified by various treatments, such as reaction with organosilane alcohols, depending on the type of chromatographic separation required. For example, the superficially porous macroparticles can be modified with a variety of organosilane groups using the procedure described in U.S. Pat. No. 3,795,313, issued on Mar. 5, 1974, to Kirkland et al.

When used as a catalyst support, the surface of the superficially porous refractory particles can also be modified appropriately. For example, a platinum metal salt can be dispersed within the porous structure of the superficial coating, then the platinum metal salt reduced in hydrogen to yield an active platinum metal catalyst. The untreated macroparticle can also be modified with an appropriate organosilane, which can then be in turn reacted with an enzyme to produce a support-coated enzyme catalyst for specific conversion of organic molecules. In all cases, the size of microparticles can be selected so that the resulting superficially porous macroparticles will have the desired pore structure for the intended application as a catalyst or catalyst support.

The colloidal particles that make up the porous layer are like each other. The alikeness of microparticles has reference mainly to their physical characteristics, but ordinarily they would be alike in chemical composition and similar in size and shape. In a preferred aspect, this size and shape will be substantially uniform such as spheres.

The present process involves surrounding the core particles by a uniform colloidal solution of the microparticles that will constitute the coating, and drying the system under conditions that allow the microparticles to pack closely on the surface of the core. The process comprises forming a uniform slurry of the core macroparticles and the coating microparticles, atomizing the slurry to form a fine spray, and either contacting the spray with a drying medium (generally air) to evaporate the liquid of the slurry or cooling the spray to below the freezing point of the slurry liquid and drying the resulting frozen material without thawing. Cooling the spray as mentioned above is conveniently achieved by reducing the temparture of a convenient container such as the chamber of a spraying apparatus so that the spray is almost instantly frozen. The frozen material is collected and then dried while still frozen, for example, in a conventional lyophilizer or freeze drying unit.

The core macroparticles are either cleaned or surface modified as desired. They can be cleansed using common laboratory methods. For example, glass bead cores can be cleaned by slurrying in a solution of laboratory glass cleanser, followed by stirring, allowing the glass beads to settle, decanting the liquid, repeating the whole procedure and finally washing with water. The core surface can be modified, for example, to induce a positive charge on the core surface by treating with a cationic agent, for example, a polymeric cationic material.

Although water is the preferred liquid for forming the slurry of macroparticles and microparticles, it is sometimes desirable to use some other liquid. The core material is washed with this liquid, then slurried in it. If the selected liquid is not soluble in water, an intermediate solvent, in which both water and the selected liquid are soluble, is used to wash the core before the final washing with the selected liquid. A well-mixed slurry of core and coating material is obtained by stirring a mixture of the same in a liquid for from about 10 minutes to about 1 hour.

In regard to spray drying, the concentration of the colloidal coating particles in the slurry must be chosen appropriately. At too high concentrations, the colloidal materials aggregate and the slurry becomes too thick to flow through the pump and the drying atomizer of the spray-drying apparatus. Stability of colloidal particles, that is their ability to retain their degree of dispersion in a liquid medium, depends on factors such as particle size, surface composition and therefore structure of the surface double layer, concentration, electrolyte ionic strength, etc. For the core-coating slurry it is critical to maintain conditions of stability of the coating material. These conditions are known to the art and vary with the factors given above. With respect to concentration special consideration should be given to particle size dependence: coatings made of larger particles can be made in more concentrated slurries than those made of smaller particles. At too low concentrations a dilute slurry results in high percentages of porous grains containing no core, i.e., yield of desired superficially coated particles is down. Generally, the ratio of the weight of microparticles to the weight of the liquid will be in be in the range 0.05 to 0.5. The ratio of total volume of coating microparticles in the slurry to total volume of coating microparticles and core macroparticles is from about 0.003 to about 0.7, preferably from about 0.01 to about 0.5.

Additives such as surface wetting agents, etc., to change viscosity and/or surface tension of the slurry, and therefore change somewhat the size of the spray droplets can be used as long as they do not affect the degree of dispersion or stability of the slurry.

To insure that the spray-dried coating adheres to the impervious core, the core can first be modified with a single layer of microparticles, for example, by the multilayering process described in U.S. Pat. No. 3,485,658, issued on Dec. 23, 1969 to Iler. For example, the surface of bare glass beads can be treated with a monolayer of a positively charged polymer, then a layer of colloidal silica sol, followed by another layer of positively charged polymer to produce a residual positive charge on the treated glass bead prior to spray drying.

The slurry can be dried using conventional spray drying or spray freeze-drying techniques. Spray drying is the transformation of a solid-liquid dispersion feed from a fluid state into a dried form by spraying a feed into a hot drying medium or into a drying medium just warmed over ambient temperatures, e.g. 25° C.

According to the literature ("Spray Drying", K. Masters, Leonard Hill Books, London, 1972) the spray drying process consists of four stages:

I. Atomization of feed into a spray.
II. Mixing and flow to produce spray-air contact.

III. Drying of spray by moisture removal.
IV. Separation of dried product from the air.

These stages are discussed in U.S. Pat. No. 4,131,542, the relevant sections of which are incorporated herein by reference. Discussion herein is limited to factors which are affected somewhat differently by the difference in feed.

1. Ultimate Particle Size of the Feed

The feed is a slurry made of a well blended mixture of macroparticles and microparticles in a liquid, preferably water. The size of the macroparticles in essence determines the particle size of the dry product since the thickness of the coating produced by the microparticles is only a fraction of the diameter of the macroparticle. The size of the microparticle, on the other hand, determines the pore size and influences the pore size distribution of the coating. Preferably both macroparticles and microparticles are spherical.

2. Concentration of Solids in the Feed

Increase of the microparticle concentration in the slurry and increase of the number of microparticles relative to the number of macroparticles increase the thickness of the coating on the macroparticle. Obviously the higher the number of microparticles in the droplets of the spray, the larger the number of microparticles that will dry on the surface of the macroparticles. An increase in the thickness of the coating will, of course, increase the size of the particle of the product relative to the size of the original macroparticle.

The total concentration of the solids, including both macroparticles and microparticles, is limited by the viscosity of the slurry. Too high a concentration of solids will increase the slurry viscosity to the point that will make it unsuitable for atomizing using conventional equipment.

Concentration of microparticles in the feed also has an influence on the shape of the grains constituting the powder product. Depending on the concentration of microparticles relative to the concentration of macroparticles, a fraction of the spray droplets may have only microparticles and no macroparticles. Such droplets will dry producing amphora-shaped porous micrograins of the kind described in U.S. Pat. No. 4,131,542. Therefore the dry product can be a mixture of coated macroparticles and hollow porous micrograins. Such a mixture can be screened or sedimented to separate the lighter, porous grains from the denser superficially porous, macroparticles.

3. Viscosity and Temperature of the Feed

The higher the viscosity of the feed, the coarser the spray at constant atomizing conditions will be. This factor has to be considered in order to control the droplet size relative to the size of the macroparticles. Viscosity is influenced by feed concentration and, in some cases, by temperature.

Other than the influence on viscosity, the effect of feed temperature is negligible. The possible increase in feed heat content is small compared to heat requirements for evaporation.

4. Feed Rate

Increase of feed rate at constant atomizing and drying conditions increases the size of the spray droplets. Therefore feed rate is an important factor to control the droplet size relative to the size of the macroparticles. Decrease of feed rate decreases, in general, the outlet temperature in the spray dryer and, therefore, there is less tendency to disrupt the microparticle layer coating the macroparticles. Changes in feed rate normally do not produce substantial changes in the deviation of the particle size distribution of the product.

Besides the feed (slurry) properties and feed rate, the following variables in dryer design and operation affect the characteristics of the dried product.

I. Atomization of Feed into a Spray

The characteristic features of spray drying are the formation of a spray, commonly referred to as "atomization", and the contacting of the spray with air. The atomization step must create a spray for optimum evaporation conditions leading to a dried product of required characteristics. Therefore, the selection and the manner of operation of the atomizer are of decisive importance in determining the kind of product obtained. Centrifugal, (rotary) pressure, kinetic energy, sonic and vibratory atomization can be used but centrifugal is preferred.

In all atomizer types, increased amounts of energy available for liquid atomization result in sprays having smaller droplet sizes. Higher energy of atomization means more break up of the liquid giving a finer mist and therefore smaller product particles. The size of the core macroparticle core will not be affected, but, on the other hand, excessive atomization energy may produce droplets of diameter smaller than the core macroparticle. In this case the microparticles dispersed in the droplet will dry separate from the glass bead forming a smaller porous micrograin (PMG) of the kind described in U.S. Pat. No. 4,131,542. Atomization energy therefore should be kept at a level suitable for the production of droplets of a size larger than the macroparticles of the slurry.

II. Spray-Air Contact

Fast heating of droplets containing microparticles produces a dry skin of microparticles when the slurry does not contain macroparticles. In this case the dry skin of microparticles traps water inside the hollow sphere. Evaporation and evolution of the trapped water tends to produce a hole through the spherical grains obtained as a product. However, in the present process using a mixture of microparticles and macroparticles, the microparticles form a dry skin on the surface of the macroparticles. If the dry skin is too thick, fast heating may create craters on the otherwise uniform coating of the macroparticle.

There are dryer designs that incorporate both "co-current" and "counter-current" layouts, i.e., mixed flow dryers. This type of design can also be used in the process of the invention.

III. Drying of Spray

When the droplets of the spray come into contact with the drying air, evaporation takes place from the droplet surface. Increase in the inlet temperature increases the dryer evaporative capacity at constant air rate. Higher inlet temperatures generally mean a more economic dryer operation. Increased temperature also may produce increased coating thickness due to a more randomized packing of the microparticles and therefore reduction in density of the coating. Generally the following air is at a temperature of from 130° C. to 400° C. with from 150° C. to 300° C. being the preferred range.

Fast evaporation could cause hollowness and even fracture of the coating. For this reason factors affecting drying rate have to be controlled to prevent or moderate lack of uniformity of the coating depending on the characteristics desired for each product.

The superficially porous macroparticles formed by spray or freeze drying are sintered and depending on the ultimate use of the particles, it may be desired to carry out acid washing treatments of the macroparticles to improve their properties for chromatography and as catalysts or catalyst supports. The sequence of these steps may be interchanged, depending on the needs of a particular system, but sintering is generally the preferred initial treatment.

An acid washing can be carried out to reduce the sodium content of the particles and to remove trace impurities such as iron. Generally, acid washing is performed at elevated temperatures, such as 50°-100° C., for a half to two hours in a fairly strong mineral acid, such as 20-50% nitric or hydrochloric acid (by volume), or at room temperature for 1-2 days in 10-20% (by volume) nitric or hydrochloric acid. Care should be exercised in the acid treatment step, since prolonged heating of the particles at high temperatures in strong acid will result in a coarsening of pores. With superficially porous particles of small pores made from small colloidal microparticles, it is desirable to use the room temperature acid-washing treatment, since this approach is unlikely to cause a significant change in pore size.

To ensure the mechanical rigidity of the original superficially porous particles as spray-dried, a sintering process is utilized. This treatment is often initially preferred over acid washing in the case of superficially porous particles made from larger microparticles, e.g. 300 nm; acid treatment of such products prior to sintering may result in degradation of the porous crust. The temperature required for proper sintering will depend on the size and composition of the microparticles and contaminants that may be present. For example, if sodium ions contaminate silica microparticles at levels above about 0.01%, the sintering temperature will be lower than that for sodium-free silica microparticles. The sintering temperature also depends on the substrate composition. The desired temperature range is 500°-700° C. when the substrate is soft glass whereas if the substrate were pure silica, then the range might be considerbly higher, perhaps up to 1050° C.

To obtain the desired mechanical strength of the superficially porous macroparticles, sintering is usually carried out in a manner so that about a 5-30% decrease in the initial superficially porous macroparticle surface area is obtained. Sintering to produce a 10-20% decrease in particle surface area is preferred. Under these conditions pore size and pore volume are essentially unchanged, but the mechanical strength of the superficially porous coating is substantially improved. To establish the temperature required for sintering, one-half to one gram samples of the dried, acid-washed powder are heated for two hours at various temperatures and surface area is determined by krypton or nitrogen adsorption methods.

The finished product of superficially porous refractory particles prepared by the present process is ready to be used to prepare columns for chromatographic separations or as catalysts or catalyst supports. Generally, when the core of the material is in the shape of spheres or similar shapes, the total diameter of the particles will be from 5-500 μm overall. The coating on such a shaped particle consists of a layer of inorganic microparticles which generally represents from 0.3 to 70% by volume of the total volume of the superficially porous coated particles.

In a preferred form of the invention, spherical glass beads of 5-250 μm in diameter will be coated with silica particles having an average particle size of 5-500 nm which form a superficially porous coating representing from 1-50% by volume of the total and will contain pores from 0.2-0.5 times the diameter of the microparticles.

Utility

The process of the invention produces superficially porous (sometimes called pellicular, porous layer, or controlled surface porosity) particles that have utility both in liquid and gas chromatography and as catalysts or catalyst supports.

The invention is further described by the following examples in which all percentages are by weight and temperatures are in degrees Celsius unless otherwise stated.

EXAMPLE 1

Superficially Porous Particles for Chromatography

To insure that the intended spray-dried coating adhered to the impervious core glass microbeads, the microbeads were modified with a single layer of colloidal silica according to the following procedure. A 0.5% water solution of a polymeric cationic material with pH adjusted to 7.0 with ammonium hydroxide was added to a washed glass bead cake to form a slurry. The glass beads had a size range of 28-58 μm. The slurry was stirred for 10 minutes at room temperature and then allowed to settle. The clear supernatant layer was poured off and the bead cake was washed in 8 liters of distilled water. Stirring was done for 10 minutes after which the mixture was allowed to settle and the clear supernatant layer poured off. This procedure for washing was repeated 3 times. To this coated bead cake was added a 5% aqueous solution of an aqueous colloidal sol containing approximately 30% $SiO_2$ characterized by extremely small particle size averaging only 7 nm, with pH adjusted to 7.0 with concentrated hydrochloric acid. After 10 minutes of rapid stirring at room temperature, the resulting mixture was allowed to settle. The clear supernatant layer was poured off and the resulting settled cake washed three times with 8 liters of distilled water to remove excess silica. This silica-coated bead cake was treated with polymeric cationic material as before to impart a positive charge on the bead surfaces before spray drying.

A spray-dry slurry was prepared by adding 363 g of the wet silica sol-coated glass bead cake containing 254 g of beads to 107 g of silica sol (54.0 g $SiO_2$, 20-22 nm particle size) while stirring rapidly. Stirring was continued at room temperature for one hour to condition the beads before spray drying. A volume of 225 ml of this slurry was then spray dried. This volume of slurry contained 308 g of solids consisting of 254 g of the silica sol coated glass beads and 54 g of the second silica sol (representing 21.25% of theory on the beads). This volume also contained 162 g of water. Hence, the ratio of weight of microparticles to weight of liquid was 0.33 and the ratio of volume of coating microparticles to total volume of coating microparticles and core macroparticles was 0.21. Spray drying conditions consisted of a two-fluid nozzle run at a feed rate of 20 ml/min with a spray drying tower inlet temperature of 140°, and an outlet temperature of 250°. The atomizer air pressure was 0.138 MPa (20 psi), with a drying tower differential pressure of 1.0 kPa (4.0 inches) of water. The slurry was stirred rapidly while it was being fed into the drier pump for spraying. Yield in the chamber collector was 127 g of product.

A portion of this spray-dried sample was sieved to produce a <44 μm particle size product (66 g), then soaked in concentrated nitric acid in a steam bath for 0.5 hours to remove impurities such as sodium and iron. After repeating this acid treatment, the beads were washed to neutrality with deionized water, then resized by rescreening to obtain fractions of 38–44 μm (13 g) and <38 μm (43 g).

One-half gram samples of the resulting product were test-fired for two hours at various temperatures, to determine the conditions of sintering required to obtain the desired particle mechanical stability. As an illustration of the sintering of acid-washed, spray-dried particles, a test was made on a typical sample of superficially porous particles made by spray-drying colloidal silica particles (~24 nm diameter) onto ~40 μm glass beads, with the results shown in Table I.

TABLE I

| Sintering Temperature, ° | Nitrogen Surface Area, m²/g |
|---|---|
| Unfired | 12.2 |
| 600 | 8.8 |
| 625 | 8.8 |
| 650 | 7.5 |
| 700 | (Partially fused) |

Following this test, the rest of the acid-washed sample was heated at 600° for two hours in air. This main fraction exhibited a nitrogen surface area of 10.8 m²/g. Nitrogen adsorption measurements indicated a very narrow mesopore size distribution with a mean internal pore diameter of 69 Å and a specific porosity of 0.034 ml/gram. Mercury porosimetry measurements also showed a very narrow mesopore size distribution with a mean internal pore diameter of 56 Å and a specific porosity of 0.036 ml/gram. Thus, the average specific porosity of this particular sample was 0.035 ml/g (average of the two analytical methods). A porosity of 0.035 ml/g corresponds to 0.035 ml of pores per gram of silica which has a density of 2.2 grams per ml so that one gram occupies 0.455 ml. In this example, therefore, the volume percent of cc of silica in the aggregates equals:

$$\frac{0.455}{0.035 + 0.455}$$

or, $0.929 \times 100$, i.e., 92.9%. Thus this superficially porous particle sample was 92.9 volume percent silica and 7.1 volume percent pores.

Scanning electron micrographs of the superficially porous macroparticles produced in this example showed a generally regular coating of about 1–2 μm thickness with some protrusions because of undesirable fine droplets formed during the spray-drying process used. The particles were coated with the desired porous shell.

EXAMPLE 2

Spray-dried Superficially Porous Particles for Size-Exclusion Liquid Chromatography The subject particles are also useful for characterizing macromolecules by the size-exclusion liquid chromatography techniques discussed in, "Modern Size-Exclusion Liquid Chromatography," W. W. Yau, J. J. Kirkland, and D. D. Bly, John Wiley and Sons, New York, 1979, and certain colloids as described in, J. J. Kirkland, J. Chromatogr., 185, 273 (1979).

Spray-dried superficially porous particles were prepared by co-spraying 200 nm silica sol with 30 μm (nominal size) glass microbeads previously coated with a single layer of colloidal silica using a procedure similar to that described in Example 1. The spray-dry slurry consisted of a water-wet cake containing 1135 g of these silica sol coated 30 μm glass beads added to 500 ml of 200 nm colloidal silica sol (46.43 g SiO$_2$/100 ml or 232 g of SiO$_2$) while stirring rapidly. Stirring was continued slowly for two hours at room temperature to condition the beads before spraying.

The slurry composition consisted of 1 liter containing 1367 g of solids which consisted of 1135 g of beads and 232 g of 200 nm SiO$_2$ (20.44% on beads, theory). The ratio of volume of coating microparticles to total volume of coating microparticles and core macroparticles was 0.20. This slurry was sprayed with a two-fluid nozzle at a feed rate of 200 ml/min and a drying tower outlet temperature of 140°. Atomizer air pressure was 0.138 MPa (20 psi) and a drying tower pressure differential of 1.0 kPa (4.0 inches) of water was measured. The slurry was stirred rapidly while it was fed into a drier pump. Final yield in the chamber collector was 46.8% of the starting feed.

The resulting bulk spray-dried sample was sintered at 600° C. for two hours and then treated in 800 ml of concentrated nitric acid in a polytetrafluoroethylene beaker on a steam bath for two hours with frequent agitation. Yellow supernatant was removed and 50 ml of fresh acid added for an additional one hour of heating. A slightly yellow liquid was removed and the resulting macroparticles repeatedly washed with 4 liters of distilled water until neutral. The resulting material was then dried at 150° overnight in a circulating air oven to produce a final product of 559 g. Sieving through appropriate screens produced a 38–44 μm fraction of 156 g. By mercury intrusion this sample exhibited a mean pore diameter of 60 nm with an internal porosity of 0.036 ml/g, or a volume porosity of 7.3%. The sample exhibited a nitrogen surface area of 1.9m²/g by the B.E.T. method.

Two 100×0.78 cm columns of these particles were prepared by the dry packing "tap-fill" procedure described in Chapter 5 of "Introduction to Modern Liquid Chromatography, Second Edition", L. R. Snyder and J. J. Kirkland, John Wiley and Sons, New York, 1979. At a flowrate of 4.0 ml/min for a mobile phase of 0.02 M aqueous triethanolamine (adjusted to pH 8 with nitric acid), these connected columns (200 cm total) exhibited a plate count of 6990 for acetone, a totally permeating solute. This column set exhibited a column specific resolution $R_{sp} = 0.58/\sigma D_2 = 0.24$ and 0.22 for acetone and colloidal silica (a 24 nm sol), respectively, where $\sigma$ = the peak standard deviation in milliliters at the indicated flowrate, and $D_2=$ the slope of the molecular weight calibration curve (corresponding to three times the slope of the spherical particle size calibration curve), as described in W. W. Yau, J. J. Kirkland, D. D. Bly and H. J. Stoklosa, J. Chromatogr., 125, 219 (1976). The packing resolution factor $R_{sp}*=R_{sp}/\sqrt{L}=0.022$ and 0.17 for acetone and colloidal silica, respectively, where L =the column length in centimeters. The data obtained showed the favorable mass transfer characteristics of spray-dried superficially porous particles so that the size-exclusion chromatography of poorly diffusing species such as inorganic colloids can be carried out in short time at relatively high mobile phase velocities without severe loss in separation resolution.

EXAMPLE 3

Superficially Porous Spray-dried Particles with Bonded-phase Coatings for Liquid Chromatography Glass microbeads were co-sprayed with 25% by weight of silica sol (60 nm silica particles). A spray-dry slurry was prepared with 842 g of water-wet uncoated 30 μm (nominal size) glass bead cake containing 640 g of beads added to 1200 ml of distilled water. This mass was added to 320 g of colloidal silica sol (50% $SiO_2=160$ g $SiO_2$ total) while stirring rapidly. The stirring was continued at room temperature for two hours to condition the beads before spray drying. Slurry volume consisted of about 2000 ml. The slurry contained 800 g of solids with 640 g of glass beads and 160 g of silica sol (25% on beads, theory). The slurry contained 1360 ml of water. The ratio of weight of microparticles to weight of liquid was 0.12 and the ratio of volume of coating microparticles to total volume of coating microparticles and core macroparticles was 0.25.

This slurry was sprayed using the two-fluid nozzle at a feed rate of 200 ml/min with a drying tower inlet temperature of 130° and an outlet temperature of 140°. Atomizer air pressure was 0.083 MPa (12 psi) and a differential pressure of 0.75 kPa (3 inches) of water was employed in the drying tower. The slurry was stirred rapidly while it was fed into a drier pump for spraying. Yield of the chamber collector was 335 g of solids or 41.87% of theory.

1,016 g of material prepared in this manner were heated at 540° for 16 hours to remove volatile impurities, the final sample weighing 1,001 g. This sample was heated at 600° for two hours in a furnace, then placed in a polyethylene beaker containing 2 liters of 10% (volume) nitric acid and allowed to stand for 24 hours with occasional stirring. A practically colorless supernatant was removed and the sample repeatedly washed with distilled water to a pH of 6.5. Resulting particles were dried in a circulating air oven at 150° for two hours and in a vacuum oven at 150° overnight. The dried material exhibited a surface area of 10.7 m$^2$/g by nitrogen adsorption, a mean pore diameter of 205 nm and a specific porosity of 0.055 ml/g by mercury intrusion, or 11.8% volume porosity.

Fifty grams of the superficially porous spray-dried macroparticles, sieve-sized to produce a 20–37 μm fraction, were placed in a 300 ml round-bottom flask and heated in a circulating air oven at 200° for two hours. With a minimum of exposure to air to maintain a water-free particle surface, 150 ml of dry pyridine was added, then 10 ml of freshly distilled chlorotrimethylsilane. The resulting mixture was gently refluxed overnight under a condenser fitted with a drying tube. The resulting particles were filtered off, washed with dry toluene and then gently refluxed in tetrahydrofuran containing 10% of water for 15 minutes. The particles were again filtered off, placed in a 300 ml round-bottom flask and dried at 200° in a circulating air over for two hours. The treatment with chlorotrimethylsilane was repeated, and the modified particle filtered off, washed thoroughly with dry toluene, tetrahydrofuran, followed by acetone. The final particles were heated in a circulating air oven at 150° for one hour.

The trimethylsilane-modified superficially porous macroparticles are highly suited for reverse-phase liquid chromatographic work and are particularly applicable for separating compounds which are normally strongly retained by conventional columns of hydrocarbon-modified totally porous small-particle columns, in particular compound types such as proteins and nucleic acid bases.

EXAMPLE 4

Superficially Porous Packings for Gas Chromatography

Suitable superficially porous particles for gas chromatography are conveniently prepared by co-spraying glass microbeads with silica sol of the appropriate size. To form these materials, glass beads were coated with a single layer of silica sol using a procedure similar to that in Example 1. 301 g of the wet bead slurry containing 250 g of the glass beads having a size range of 63–74 μm were added to 272 ml of 270 nm silica sol (20 g $SiO_2$/ml) while stirring rapidly. The resulting slurry was continuosly stirred at room temperature for two hours to condition the beads before spraying. The slurry composition consisted of a volume of 440 ml containing 278 g of water and 304 g of solids consisting of 250 g of beads and 54.4 g of silica sol (21.76% on beads, theory). The ratio of weight of microparticles to weight of liquid was 0.20 and the ratio of volume of coating microparticles to total volume of coating microparticles and core macroparticles was 0.22. Spraying was carried out with a two-fluid nozzle operated at a feed rate of 200 ml/min with a drier outlet temperature of 260°, using an atomizer air pressure of 0.055 MPa (8 psi). The drying tower was operated with a pressure differential of 0.75 kPa (3.0 inches) of water. The slurry was stirred rapidly while it was fed into a drier pump during the spraying process. Yield in the chamber collector was 160 g of solids representing 55.5% of the total solids sprayed.

After heating at 625° for two hours in a furnace and acid-washing and drying using procedures similar to those described in Example 3, the resulting product showed a surface area of 0.6 m$^2$/g by nitrogen adsorption and a mean pore diameter of 120 nm by mercury intrusion. The porous shell consisting of close-packed 200 nm silica sol microparticles was about 2 μm thick, as determined by scanning electron microscopy.

A 63–70 micron fraction of these macroparticles was prepared by dry-sieving, and these particles were coated with 0.5% of poly(methylsiloxane), by the techniques described in Chapter 3 of "Modern Practice of Gas Chromatography", R. L. Grob, ed., John Wiley and Sons, New York, 1977. The resulting superficially porous microparticles with mechanically-held stationary phase were then tap-filled into a 25×0.2 cm stainless steel column blank. This column was equilibrated at 300° in a gas chromatographic apparatus for two hours with a helium carrier gas flowrate of 20 cc/min until a stable baseline was obtained with a flame ionization detector. This column exhibited the ability to separate rapidly a wide variety of organic compounds.

We claim:

1. A process for preparing superficially porous macroparticles comprising
   (a) forming a well mixed slurry of core macroparticles, colloidal inorganic microparticles to coat the macroparticles, and a liquid, said core macroparticles being (1) impervious and stable, (2) regularly shaped and (3) about 5–200 μm in size and said microparticles being substantially uniform in size and shape and having a size of about 4–1000 nm; the ratio of the weight of the microparticles to weight of liquid being from about 0.05 to about 0.5 and the ratio of volume of coating microparticles to total volume of coating microparticles and core macroparticles being from about 0.003 to about 0.7;
   (b) atomizing the slurry to form a fine spray using spraying conditions suitable to produce droplets of a size greater than the size of the core macroparticles;
   (c) contacting the spray with a drying medium at a temperature of from about 130° C. to about 400° C. to evaporate the liquid or cooling the spray below the freezing point of the liquid and drying the resulting frozen particles without thawing them; and
   (d) heating the resulting dried coated macroparticles at a temperature and for a time sufficient to cause sintering resulting in about 5% to about 30% decrease in surface area of said dried, coated macroparticles.

2. A process according to claim 1 wherein the microparticles are from about 5 to about 250 nm in size.

3. A process according to claim 2 wherein the ratio of the total volume of coating microparticles to total volume of coating microparticles and core macroparticles is from about 0.01 to about 0.5.

4. A process according to claim 3 wherein the dried particles are heated at a temperature and for a time sufficient to cause sintering resulting in about 10% to about 20% decrease in surface area of said dried particles.

5. A process according to claim 4 wherein the spray is contacted with a drying medium at a temperature of from about 130° C. to about 400° C. to evaporate the liquid.

6. A process according to claim 5 wherein the drying medium is air.

7. A process according to claim 6 wherein the liquid is water.

8. A process according to claim 7 wherein the temperature in step (c) is from about 150° C. to about 300° C.

9. A process according to claim 8 wherein the dried coated macroparticles are washed in acid.

10. A process according to claim 9 wherein the acid washing is after step (d).

11. A process according to claim 10 wherein the acid washed coated macroparticles are rinsed in distilled water and dried.

12. A process according to claim 8 wherein spraying is effected in a rotary atomizer.

13. A process according to claim 8 wherein the macroparticles are glass beads.

* * * * *